United States Patent Office 2,821,512
Patented Jan. 28, 1958

2,821,512

CYCLOPENTADIENYL(VINYLCYCLOPENTA-DIENYL)IRON AND POLYMERS THEREOF

Alfred C. Haven, Jr., Hancocks Bridge, N. J., assignor to E. I. du Pont de Nemours and Company, Wilmington, Del., a corporation of Delaware No Drawing. Application October 26, 1953
Serial No. 388,461

9 Claims. (Cl. 260—2.1)

This invention relates to new derivatives of dicyclopentadienyliron. More particularly it relates to cyclopentadienyl(vinylcyclopentadienyl)iron and to its homopolymer and copolymers.

Until recently, no compounds were known in which iron is directly attached to a hydrocarbon radical. Dicyclopentadienyliron, the first such compound to be discovered, was described by Kealy and Pauson in Nature 168, 1039 (1951) and is claimed in Pauson U. S. application Serial No. 291,567, filed June 3, 1952, now Patent No. 2,680,756. It is a useful gasoline antiknock agent. Various derivatives of dicyclopentadienyliron have since been prepared, including the diacyl derivatives and the dicarboxylic acid described by Woodward et al. in J. Am. Chem. Soc. 74, 3458 (1952). The monoacyl derivative and the monocarboxylic acid of dicyclopentadienyliron are disclosed, respectively, in pending applications Serial Nos. 312,852, now abandoned and 312,853, now Patent No. 2,683,157, of Weinmayr, each filed October 2, 1952. There has not been described heretofore, however, any derivative of dicyclopentadienyliron having an unsaturated side chain or any polymeric derivative thereof.

There has now been discovered the compound cyclopentadienyl(vinylcyclopentadienyl)iron which is a red crystalline product melting when pure at about 50–51° C. It has a strong camphor-like odor and is very soluble in all the usual organic solvents. The compound shows strong absorption in the infrared at 6.12 microns. In methanol solution it displays a maximum in the ultraviolet absorption spectrum at 2730 A. and a maximum in the visible absorption spectrum at 4420 A. It is believed to have the following structure:

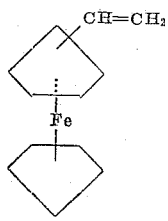

X-ray diffraction studies conducted on dicyclopentadienyliron by Dunitz and Orgel, reported in Nature 171, 121 (1953), indicate that the compound has a sandwich type structure and that the apices of the two pentagons do not coincide. According to Wilkinson et al. in J. Am. Chem. Soc. 74, 2125 (1952), all five positions on each cyclopentadienyl ring are equivalent, so that no isomerism with respect to any one ring is possible for a mono-substituted dicyclopentadienyliron.

Cyclopentadienyl(vinylcyclopentadienyl)iron is prepared from cyclopentadienyl(alpha-hydroxyethylcyclopentadienyl)iron which is described in Haven U. S. application Serial No. 365,558, filed July 1, 1953, now Patent No. 2,810,737. The latter compound may be prepared by reducing acetylcyclopentadienyl(cyclopentadienyl)iron either with hydrogen using a Raney nickel catalyst or with lithium aluminum hydride. The cyclopentadienyl(alpha-hydroxyethylcyclopentadienyl)iron is converted to the desired vinyl derivative by dehydration or by first converting it to its acetate and then subjecting the acetate to thermal dehydroacetylation.

Cyclopentadienyl(vinylcyclopentadienyl)iron may be readily polymerized, alone or with other unsaturated compounds, by means of conventional polymerization techniques. The polymerization may be carried out either in solution, in emulsion or as a bulk or mass polymerization in the absence of a solvent or dispersing medium. In each case a polymerization initiator is used and the mixture is heated to produce the polymerization. Suitable polymerization initiators include azobis(isobutyronitrile), phosphoric acid, and alkali metal persulfates. Benzoyl peroxide appears to be somewhat less effective for this purpose. When polymerization is to be carried out in emulsion, a dispersing agent such as sodium lauryl sulfate should be present.

The homopolymer obtained by polymerization of cyclopentadienyl(vinylcyclopentadienyl)iron is a light yellow to tan powder melting between 280 and 285° C. The polymer is insoluble in water or methanol, but is soluble in benzene, from which it may be cast to give films.

Cyclopentadienyl(vinylcyclopentadienyl)iron may also be copolymerized with one or more other compounds containing at least one ethylenic unsaturation. Thus it can be copolymerized with acrylic esters such as methyl and ethyl acrylates, chloroacrylic esters, methacrylic esters, vinyl chloride, vinylidene chloride, styrene, methylvinyl ketone, acrylonitrile, methacrylonitrile, fumaric esters, maleic anhydride, and also with dienes such as butadiene and chloroprene (2-chloro-1,3-butadiene). Such unsaturated compounds may be themselves polymerizable, e. g., styrene, methyl methacrylate, etc., or may be capable only of taking part in copolymerizations, e. g., maleic anhydride and fumaric esters. In general the reaction takes place readily, though in some cases, the copolymerization occurs slowly and incompletely.

The physical and chemical properties of the various copolymers differ considerably depending on the nature of the other unsaturated ingredients and on the proportions of reactants used. Thus the copolymer obtained from the reaction of styrene with only a small amount of the cyclopentadienyl(vinylcyclopentadienyl)iron has a lower softening point than when larger amounts of the iron compound are present. In general, the cyclopentadienyl(vinylcyclopentadienyl)iron must comprise at least 1% of the total weight of monomers used in order for it to have any apparent effect on the properties of the resulting copolymer. Many of the copolymers are solid materials which can be cast into clear films and which have melting points of 150° C. or higher. The copolymer of cyclopentadienyl(vinylcyclopentadienyl)iron with chloroprene is a tough, yellow elastomer which can be milled to give a clear brown synthetic rubber.

Polymers made from cyclopentadienyl(vinylcyclopentadienyl)iron possess the valuable property of being readily oxidizable to the ionic form, from which the original form is easily regenerated by reduction. For example, the homopolymer of cyclopentadienyl(vinylcyclopentadienyl)iron is a water-insoluble yellow to tan solid. When it is oxidized by means of an agent such as silver nitrate or ceric sulfate, there is formed a blue-green water-soluble oxidized product. This water-soluble product may be reconverted to the original insoluble yellowish solid by reduction with a material such as ascorbic acid. Copolymers of cyclopentadienyl(vinylcyclopentadienyl)iron with other unsaturated monomers also exhibit this ability to be readily and reversibly oxidized and reduced. A green or blue-green color appears to be characteristic of the oxidized form.

The compounds of this invention and their methods of preparation are illustrated in the following examples.

EXAMPLE 1

A. Preparation of acetylcyclopentadienyl(cyclopentadienyl)iron

Into a 1000 ml. capacity stainless steel vessel are charged 200 g. of acetic anhydride and 65 g. of dicyclopentadienyliron (M. P. 174° C.). The vessel is closed, cooled to below 0° C., and connected with a container of anhydrous hydrogen fluoride. From 300 to 330 g. of anhydrous hydrogen fluoride are added to the charge over a period of about 15 minutes while cooling is maintained to keep the temperature below 10° C. The hydrogen fluoride container is then disconnected and the reaction vessel is agitated. The temperature of the charge is raised to 40° over a period of two hours and agitation is continued at 40–43° for 12 hours. The charge is then poured into 2000 g. of cold water while keeping the temperature of the dilution mass below 40° C. An orange-colored crystalline precipitate of acetylcyclopentadienyl(cyclopentadienyl)iron is obtained. After filtration, washing, and drying it weighs 62 g. equal to a yield of 83% based on dicyclopentadienyliron. It melts at 83–84° C. and is pure enough for most uses. Upon crystallization from isooctane, pure acetylcyclopentadienyl(cyclopentadienyl)iron is obtained in the form of dark orange needles melting at 86° C. Repeated crystallization does not change this melting point.

B. Preparation of cyclopentadienyl(alpha-hydroxyethylcyclopentadienyl)iron by hydrogenation A mixture of 5 g. of acetylcyclopentadienyl(cyclopentadienyl)iron in 100 cc. methanol is heated for 30 minutes under 2000 lbs./sq. in. hydrogen pressure at 50° C. in the presence of catalytic amounts of Raney nickel. The catalyst is removed by filtration, and the methanol solution of the product evaporated to dryness. Yellow crystals form and are recrystallized from petroleum ether to give a nearly quantitative yield of the desired carbinol, M. P. 76–7° C.

Analysis.—Calc'd. for $C_{12}H_{14}OFe$: C, 62.64; H, 6.13; Fe, 24.27. Found: C, 62.21, 62.88; H, 6.16, 6.16; Fe, 24.2.

C. Preparation of cyclopentadienyl(alpha-hydroxyethylcyclopentadienyl)iron by chemical reduction In a four-necked, one-liter flask equipped with a reflux condenser protected from the atmosphere by means of a calcium chloride tube, a nitrogen inlet, a paddle stirrer and a dropping funnel, are placed 22.8 g. (0.10 mole) acetylcyclopentadienyl(cyclopentadienyl)iron and 500 ml. anhydrous ether. The mixture is stirred and treated dropwise with a suspension of 1.90 g. (0.05 mole) of finely-ground lithium aluminum hydride in 100 ml. of anhydrous ether. After the addition is complete, the mixture is heated under reflux with stirring for two hours. A solution of 20 ml. of ethyl acetate in 50 ml. of ether is added to destroy the excess lithium aluminum hydride. The suspension is then cooled in an ice-bath and treated with 26.8 g. (0.5 mole) of ammonium chloride in 50 ml. of water. After having been stirred one-half hour at 0–5°, the reaction mixture is filtered and the organic layer of the filtrate separated. This layer is washed twice with 100 ml. portions of water, dried with sodium sulfate and concentrated at 10 mm. to an oil which crystallizes on cooling. The product is cyclopentadienyl(alpha-hydroxyethylcyclopentadienyl)iron, melting at 69–72°. After recrystallization from a mixture of ether and petroleum ether, a melting point of 73–75° is observed.

Analysis.—Calc'd. for $C_{12}H_{14}OFe$: C, 62.64; H, 6.13. Found: C, 63.07, 63.05; H, 6.13, 6.09.

The infrared absorption spectrum shows no carbonyl absorption but strong hydroxyl absorption.

D. Preparation of the carbinol acetate

One gram of the carbinol prepared by the lithium hydride reduction method described above is dissolved in 2 ml. of acetic anhydride and 5 ml. of dry pyridine at 0–5°, and allowed to stand overnight at room temperature. The reaction mixture is concentrated in vacuo to an oil which crystallizes on cooling. The product, after washing with a little petroleum ether, melts at 63–65°. After sublimation at 60° and 0.2 mm., the carbinol acetate melts at 67–68°.

Analysis.—Calc'd. for $C_{14}H_{16}O_2Fe$: C, 61.79; H, 5.93. Found: C, 60.9, 62.3, 61.0; H, 5.76, 5.57, 6.04.

The compound shows strong absorption in the infrared at the ester carbonyl region (5.78μ) and no absorption in the hydroxyl region.

E. Preparation of cyclopentadienyl(vinylcyclopentadienyl)iron by liquid phase thermal dehydroacetylation Twenty grams of the carbinol acetate prepared as described above are heated under 100 mm. pressure under a short column. At a pot temperature of about 150° C., acetic acid is formed and distills from the system. The temperature of the pot is gradually increased to 200° C. during about 15 minutes to complete the reaction. The product crystallizes on cooling, and is purified by dissolving it in methanol, leaving behind a trace of insoluble, tarry material, evaporating the methanol, and subliming, to give a nearly quantitative yield of red crystals, melting point 50.5–51° C.

Analysis.—Calc'd. for $C_{12}H_{12}Fe$: C, 67.96; H, 5.70; Fe, 26.33. Found: C, 67.74, 67.95; H, 5.81, 6.01; Fe, 26.10. $H_2$ Number 0.0104; 0.0096 g. $H_2$/g.; theory, 0.0095 g. $H_2$/g.

EXAMPLE 2

Cyclopentadienyl(vinylcyclopentadienyl)iron by dehydration of cyclopentadienyl(alpha-hydroxyethylcyclopentadienyl)iron Over a period of one-half hour, ten grams of cyclopentadienyl(alpha-hydroxyethylcyclopentadienyl)iron are distilled through a tube measuring 2.8 x 20 cm. packed with chromatography-grade alumina and heated to 200–209°. The system is maintained under a pressure of 36 mm. of nitrogen, at which pressure the carbinol boils at 137–144°. The material which passes through the tube is added to that obtained after cooling by eluting the alumina with ether. The combined product is redistilled through a short Vigreux section. The product obtained boils at 80–85° (0.2 mm.) and melts at 48–49°. It is very soluble in all the usual organic solvents and has a strong, camphor-like odor.

Analysis.—Calc'd. for $C_{12}H_{12}Fe$: C, 67.96; H, 5.70; Fe, 26.33. Found: C, 67.8, 67.6; H. 5.67, 5.56; Fe, 26.8, 26.3.

The compound shows strong absorption in the infrared at 6.12μ. In methanol solution it has a maximum in the ultraviolet absorption spectrum at 2730 A. and a maximum in the visible absorption spectrum at 4420 A.

EXAMPLE 3

Homopolymerization of cyclopentadienyl(vinylcyclopentadienyl)iron

A. WITH AZOBIS(ISOBUTYRONITRILE) CATALYST (1) A solution of 1 g. of cyclopentadienyl(vinylcyclopentadienyl)iron and 0.02 g. of azobis(isobutyronitrile) in 10 cc. of thiophene-free benzene is heated under nitrogen for 16 hours at 80–90° C. The resulting clear, red solution is poured into methanol. A light yellow precipitate of the polymer forms. For purification, the product is redissolved in benzene, reprecipitated in methanol, and dried in vacuum, giving a purified, light yellow polymer. A film of the polymer cast from benzene solution is insoluble in water. It reacts with aqueous silver nitrate solution to form metallic silver and a blue-green aqueous solution of the polymer in the oxidized ionic form. Reduction by the addition of an aqueous solution of ascorbic acid results in the precipitation of a light yellow powder, apparently identical with the initial polymer.

(2) Cyclopentadienyl(vinylcyclopentadienyl)iron (0.5 g.) is heated for two hours at 80° with 10 mg. of azobis-(isobutyronitrile). The product is a viscous syrup. This is stirred with 2 ml. of methanol and filtered to give a tan powder, melting point 280–285°, insoluble in methanol and ether, soluble in chloroform and benzene.

One gram of a similar polymer obtained from cyclopentadienyl(vinylcyclopentadienyl)iron is stirred for two hours in a solution of 2.5 g. of ceric sulfate $(Ce(HSO_4)_4)$ in 50 ml. of water. The resulting blue-green solution containing the soluble, oxidized polymer is filtered and the filtrate treated with excess ascorbic acid. The precipitate formed is filtered off, washed and air dried to give one gram of the original polymer.

B. WITH ACID CATALYST

Cyclopentadienyl(vinylcyclopentadienyl)iron (0.4 g.) is heated at 80° C. for two hours with one drop of 85% phosphoric acid. The product is a viscous oil, insoluble in methanol, soluble in benzene.

C. WITH PERSULFATE CATALYST

One gram of cyclopentadienyl(vinylcyclopentadienyl)-iron, 1 ml. water and 20 mg. of potassium persulfate are heated, with occasional shaking, at 80° for 6 hours. The product is a viscous oil insoluble in methanol, but soluble in benzene.

EXAMPLE 4

*Copolymerization of cyclopentadienyl(vinylcyclopentadienyl)iron*

A. WITH STYRENE (1) A solution of 2 g. of styrene, 0.5 g. of cyclopentadienyl(vinylcyclopentadienyl)iron and 0.02 g. of azobis-(isobutyronitrile) in 5 cc. of thiophene-free benzene is heated under nitrogen for 16 hours at 80–90° C. The resultant very light yellow copolymer of styrene and cyclopentadienyl(vinylcyclopentadienyl)iron is precipitated in methanol. After purification by redissolution in benzene, reprecipitation in methanol, and drying it weighs 1.1 g. Clear, very light yellow films are obtained by evaporation of a benzene solution of the copolymer.

(2) A solution of 4.0 g. (0.0189 mole) of cyclopentadienyl(vinylcyclopentadienyl)iron, 7.86 g. (0.0755 mole) of styrene monomer and 0.12 g. of azobis(isobutyronitrile) is heated two hours at 80°. The product is dissolved in benzene and added slowly with stirring to cold methanol. The resulting solid is reprecipitated in the same manner to give the copolymer, melting point 158–165°. percent Fe=4.3, 4.2.

B. WITH METHYL METHACRYLATE

A solution of 2.0 g. (0.02 mole) of methyl methacrylate monomer, 1.06 g. (0.005 mole) of cyclopentadienyl(vinylcyclopentadienyl)iron and 30 mg. of azobis(isobutyronitrile) is heated at 75–80° for 3 hours. The product is dissolved in 10 ml. of benzene and added slowly to 100 ml. of cold methanol with stirring. The resulting solid copolymer is washed thoroughly with methanol. After air-drying, it melts at 190–210°.

*Analysis.*—Calc'd. for 4 mols acrylate/mol iron compound: Fe, 9.12. Found: 10.3, 10.5.

C. ADDITIONAL COPOLYMERS AND FILMS

To four glass reaction vessels each containing 0.5 g. of cyclopentadienyl(vinylcyclopentadienyl)iron, 10 cc. of thiophene-free benzene and 0.05 g. of azobis(isobutyronitrile), there are added, respectively, 2 g. of methyl methacrylate, 2 g. of styrene, 2 g. of vinyl acetate, and 2 g. of acrylonitrile. The reactors are swept with nitrogen, closed, and heated for 18 hours at 80–90° C. A precipitate forms in the reactor to which the acrylonitrile is added; the others remain clear. The tables below show the isolation procedure employed, the weight and analyses of the products, and the appearance of pressed films made therefrom.

| Reactor | Comonomer | Precipitated in and washed with— | Product Wt., g. | Percent Fe | Vinyl-DCPI (Percent) |
|---|---|---|---|---|---|
| A | Methyl methacrylate. | Methanol | 0.6 | 6.95 | 26.7 |
| B | Styrene | ----do---- | 1.2 | 3.3 | 12.7 |
| C | Vinyl acetate | Petroleum ether | 0.04 | | |
| D | Acrylonitrile | Methanol | 1.7 | 6.0 | 23.1 |

| Polymer from— | Films pressed at— | Appearance |
|---|---|---|
| | °C. | |
| A | 150–170 | Clear, light brown, brittle. |
| B | 130–150 | Clear, light yellow, soft. |
| D | 150–190 | Brown, brittle. |

D. OXIDATION OF COPOLYMER

One gram of a styrene-cyclopentadienyl(vinylcyclopentadienyl)iron copolymer (50/50 mole ratio) is stirred for four hours in 20 ml. of water containing 3.34 g. of ceric sulfate (100% excess). The oxidized copolymer is a dark green solid which is readily reduced with aqueous ascorbic acid to the original yellow copolymer.

EXAMPLE 5

*Emulsion polymerization*

A. WITH STYRENE

To a series of four reactors each containing 30 cc. of distilled water, 0.2 g. sodium hydroxide, and 0.5 g. of technical grade sodium lauryl sulfate dispersing agent, there are added the amounts of cyclopentadienyl(vinylcyclopentadienyl)iron, styrene and azobis(isobutyronitrile) indicated in the table below. The polymerization mixtures are agitated for 4 hours at 80° C. under nitrogen. Stable latices form and are flocculated with methanol. The polymeric products are isolated by filtration, and are purified by redissolution in benzene, precipitation in methanol, and drying. Weights of products, temperatures required for film pressing, and the nature of the films are as follows:

| | Vinyl DCPI, g. | Styrene, g. | Azobis-(isobutyronitrile), g. | Polymer, g. | Percent Fe | Films Pressed at— | Appearance |
|---|---|---|---|---|---|---|---|
| | | | | | | Degrees | |
| A | 1 | 5 | 0.5 | 2.7 | 6.30 | 150–170 | Light yellow; fairly brittle. |
| B | 3 | 3 | 0.3 | 3.4 | 13.56 | 160–180 | Yellow; brittle. |
| C | 4 | 1 | 0.3 | 1.8 | 21.49 | 190–220 | Reddish-yellow; brittle. |
| D | 3 | 0 | 0.2 | 1.15 | 26.35 | 250 | Red; very brittle. |

B. WITH METHYL METHACRYLATE

An emulsion polymerization mixture containing 5 g. of methyl methacrylate, 2 g. of cyclopentadienyl(vinylcyclopentadienyl)iron, 50 cc. of distilled water, 0.2 g. of technical sodium lauryl sulfate dispersing agent, and 0.1 g. of azobis(isobutyronitrile) is agitated under nitrogen for 12 hours at 80° C. The polymeric product is isolated by flocculation of the latex with methanol, and is purified by dissolving in benzene and precipitating with methanol. The dried polymer weighs 1.6 g., is light yellow in color and contains 13.6% Fe. When pressed at 160° C., brittle yellow films are obtained.

C. WITH CHLOROPRENE

Five grams of cyclopentadienyl(vinylcyclopentadienyl) iron and 4.0 g. of finely ground Nancy Wood rosin are dissolved in 100 g. chloroprene. The solution, maintained in a nitrogen atmosphere, is homogenized mechanically with 100 ml. of water containing one gram of sodium hydroxide. The emulsion is stirred at 40° under nitrogen and polymerization is initiated by the addition of 0.5 g. potassium persulfate. With the aid of a cooling bath, the temperature is maintained at 39–41° until the reaction is complete (about one hour). The reaction mixture is stirred for 20 minutes at 40°, then poured into brine. The resulting yellow, tough elastomer is washed and dried on a mill to give a clear, brown rubber.

*Analysis.*—Calc'd.: Fe, 1.21%. Found: 1.15, 1.11%.

Cyclopentadienyl(vinylcyclopentadienyl)iron is useful as the monomeric starting material in the formation of the valuable polymers of this invention and is also of value as a reactant in the synthesis of other dicyclopentadienyliron derivatives, many of which are useful as antiknock agents, fungicides, and pesticides. The reactivity of this compound makes possible the preparation of a wide range of organo-iron compounds.

The polymers and copolymers of cyclopentadienyl(vinylcyclopentadienyl)iron are useful as electron exchange polymers, as ion exchange resins and as polyelectrolytes, as a result of their redox properties. They are the first polymeric products known in which iron is attached directly to a hydrocarbon radical.

What is claimed is:

1. Cyclopentadienyl(vinylcyclopentadienyl)iron.
2. Polymerized cyclopentadienyl(vinylcyclopentadienyl)iron.
3. A homopolymer of cyclopentadienyl(vinylcyclopentadienyl)iron.
4. A copolymer of cyclopentadienyl(vinylcyclopentadienyl)iron with another ethylenically unsaturated compound.
5. A copolymer of cyclopentadienyl(vinylcyclopentadienyl)iron with styrene.
6. A copolymer of cyclopentadienyl(vinylcyclopentadienyl)iron with methyl methacrylate.
7. A copolymer of cyclopentadienyl(vinylcyclopentadienyl)iron with chloroprene.
8. A blue-green water-soluble homopolymer of cyclopentadienyl(vinylcyclopentadienyl)iron in oxidized ionic form.
9. A copolymer of cyclopentadienyl(vinylcyclopentadienyl)iron with another ethylenically unsaturated compound, which copolymer is in oxidized ionic form.

References Cited in the file of this patent

Woodward et al.: Journal American Chemical Society, vol. 74, pp. 3458–59, July 5, 1952.